United States Patent
Patesaria et al.

(10) Patent No.: US 9,838,507 B2
(45) Date of Patent: Dec. 5, 2017

(54) SYSTEM AND METHOD FOR PROVIDING REDIRECTION OF BLUETOOTH DEVICES

(71) Applicant: Dell Products L.P., Round Rock, TX (US)

(72) Inventors: Sharad K. Patesaria, Bangalore (IN); Vidya Wakodikar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 175 days.

(21) Appl. No.: 14/746,318

(22) Filed: Jun. 22, 2015

(65) Prior Publication Data

US 2016/0373555 A1 Dec. 22, 2016

(51) Int. Cl.
*G06F 11/00* (2006.01)
*H04L 29/06* (2006.01)
*H04W 4/00* (2009.01)
*H04L 29/08* (2006.01)

(52) U.S. Cl.
CPC .......... *H04L 67/42* (2013.01); *H04L 67/2814* (2013.01); *H04L 67/32* (2013.01); *H04W 4/008* (2013.01)

(58) Field of Classification Search
CPC ......... H04L 29/06; H04L 29/08; H04L 67/42; H04L 67/32; H04L 67/2814; H04W 4/00; H04W 4/008; G06F 9/4416

USPC .................................................. 709/223, 203
See application file for complete search history.

(56) References Cited

U.S. PATENT DOCUMENTS

| | | | |
|---|---|---|---|
| 7,570,917 B2* | 8/2009 | Lee ..................... | H04M 1/7253 370/328 |
| 7,756,479 B2* | 7/2010 | Lee ..................... | H04M 1/7253 370/328 |
| 2007/0155324 A1* | 7/2007 | Lee ..................... | H04M 1/7253 455/41.2 |
| 2009/0264075 A1* | 10/2009 | Lee ..................... | H04M 1/7253 455/41.2 |

* cited by examiner

*Primary Examiner* — Kenneth R Coulter
(74) *Attorney, Agent, or Firm* — Baker Botts L.L.P.

(57) ABSTRACT

A method and system includes, by a computing device, redirecting a connected Bluetooth device connected to a local client such that the properties and functionalities of the Bluetooth device are available to applications hosted at a server. A virtual Bluetooth device is created and a virtual Bluetooth driver and a real Bluetooth driver a loaded by the operating system of the server. Requests from applications at the server are converted to transaction requests and transmitted to the Bluetooth device whereupon responses from the Bluetooth device are directed to the requesting application.

14 Claims, 5 Drawing Sheets

SYSTEM AND METHOD FOR PROVIDING REDIRECTION OF BLUETOOTH DEVICES

FIELD

The disclosure relates in general to remote computing, and more particularly to managing access to a redirected device, and more particularly to providing redirection of Bluetooth devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems One approach to the design and implementation of information handling systems for computer networks, particularly with regard to the development of client/server applications, includes designing client applications and client terminals so that the majority of the heavily used resources are at a remote computing machine, such as a centralized server, connected via a network. The client terminals generally have minimal memory, disk storage, and processor power, but are designed under the premise that most users connected to a powerful server do not need the additional processing power. With these client terminals, the total cost of ownership is minimized, because of the reduced resources and because the clients can be centrally administered and updated from the server. As such, these client terminals are suited for a network that can handle a significant number of terminals. If the client terminals have devices attached to them, then when the client terminals are connected to the server, not only the client terminals but also the client terminals' devices can become available to the server.

Some information handling systems provide wireless communications on multiple communication protocols. For example, some information handling systems provide Bluetooth wireless communication capabilities. Bluetooth is a wireless personal area network (WPAN) technology from the Bluetooth Special Interest Group, and Bluetooth is an open standard for short-range transmission of digital voice and data that supports point-to-point and multipoint applications. One problem with Bluetooth communication capabilities is that the Bluetooth devices are limited to the host information handling system.

DETAILED DESCRIPTION

Figure 1:
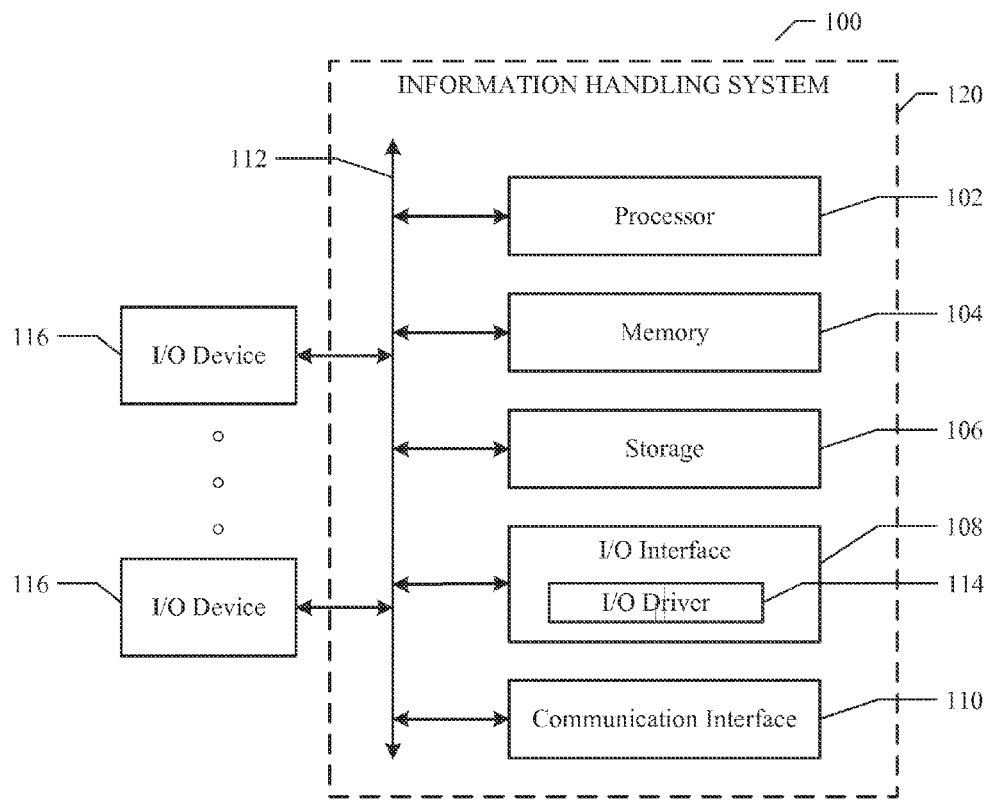
FIG. 1 is a conceptual block diagram of selected elements of an information handling system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Frequently, devices connected to client terminals (also referred to as "clients" or "client-side devices") are virtualized on a server to provide access to the devices from user sessions on the server. The virtualized devices (or redirected devices), however, are accessible from a large number of user sessions and/or client terminals. For example, in an office environment, multiple user sessions and/or clients may be connected to a server on which the device is virtualized (or redirected), and all of the multiple user sessions and/or clients connected to the server may have access to the device. A user's virtualized device connected to the user's client terminal may not be accessible by other devices connected to other client terminals. For example, Bluetooth devices connected to a user's client terminal may only be accessible by the user at that client terminal.

A need therefore exists for systems and methods that allow access to redirected Bluetooth devices, such that access to such Bluetooth devices can be provided for other users of the computer network other than the host client terminal that is connected to a given Bluetooth device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, a wireless device, for example, a Bluetooth device, a video display, and any other device known to one of ordinary skill in the art. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-7, wherein like numbers are used to indicate like and corresponding parts.

FIG. 1 illustrates a simplified diagram of information handling system configuration 100 in accordance with an aspect of the present disclosure. In particular embodiments, one or more information handling systems 120 perform one or more steps of one or more methods described or illustrated herein. In particular embodiments, one or more information handling systems 120 provide functionality described or illustrated herein. In particular embodiments, software running on one or more information handling systems 120 performs one or more steps of one or more methods described or illustrated herein or provides functionality described or illustrated herein. Particular embodiments include one or more portions of one or more information handling systems 120. Herein, reference to an information handling system may encompass a computing device, and vice versa, where appropriate. Moreover, reference to an information handling system may encompass one or more information handling systems, where appropriate.

This disclosure contemplates any suitable number of information handling systems 120. This disclosure contemplates information handling system 120 taking any suitable physical form. As example and not by way of limitation, information handling system 120 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, a terminal, a thin client, a slim client, a lean client, or a combination of two or more of these. Where appropriate, information handling system 120 may include one or more information handling systems 120; be unitary or distributed; span multiple locations; span multiple machines; span multiple data centers; or reside in a cloud, which may include one or more cloud components in one or more networks. Where appropriate, one or more information handling systems 120 may perform without substantial spatial or temporal limitation one or more steps of one or more methods described or illustrated herein. As an example and not by way of limitation, one or more information handling systems 120 may perform in real time or in batch mode one or more steps of one or more methods described or illustrated herein. One or more information handling systems 120 may perform at different times or at different locations one or more steps of one or more methods described or illustrated herein, where appropriate.

In particular embodiments, information handling system 120 includes a processor 102, memory 104, storage 106, an input/output (I/O) interface 108, a communication interface 110, a bus 112, and an I/O driver 114. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program, for example, software. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 120 may load instructions from storage 106 or another source (such as, for example, another information handling system 120) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 120 and one or more I/O devices 116. Information handling system configuration 100 may include one or more of these I/O devices 116, where appropriate. In particular embodiments, the device 116 may be a device with a USB interface, a serial port interface, a parallel port interface, or a combination thereof. One or more of these I/O devices 116 may enable communication between a person and information handling system 120. As an example and not by way of limitation, an I/O device 116 may include a wireless device (such as a Bluetooth device), a keyboard, keypad, microphone, monitor, mouse, printer, facsimile, scanner, speaker, still camera, stylus, tablet, touch screen, trackball, video camera, another suitable I/O device 116 or a combination of two or more of these I/O devices 116. An I/O device 116 may include one or more sensors. This disclosure contemplates any suitable I/O devices 116 and any suitable I/O interfaces 108 for them. Where appropriate, I/O interface 108 may include one or more I/O drivers (such as device or software drivers) 114 enabling processor 102 to drive one or more of these I/O devices 116. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both for providing one or more interfaces for communication (such as, for example, packet-based communication) between information handling system 120 and one or more other information handling systems 120 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 120 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 120 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 120 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 120 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
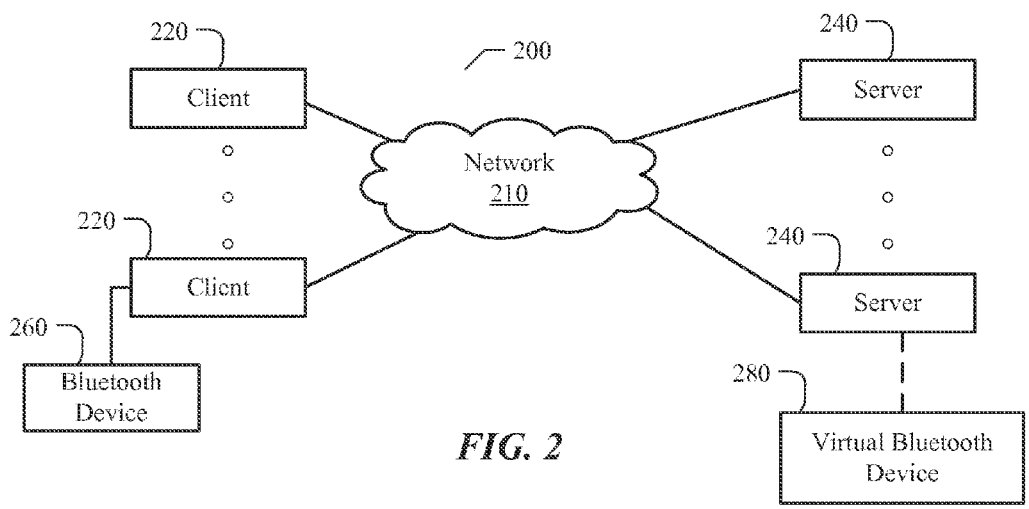
FIG. 2 is a conceptual block diagram of selected elements of a computer network environment.

FIG. 2 is a conceptual block diagram of selected elements of a computer network environment 200 according to an aspect of the disclosure. In particular embodiments, one or more client devices 220 and one or more servers 240 are connected via network 210. Network 210 may be a public network or a private (e.g. corporate) network. Additionally, network 210 may be, for example, a Local Area Network (LAN), a Wide Area Network (WAN), a wireless network, the Internet, an intranet or any other suitable type of network. One or more client devices 220 may be connected to the network 210 via a network switch (not shown). In particular embodiments, network 210 may include one or more routers for routing data between client devices 220 and/or servers 240. A device (for example, a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (for example, customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system 120. In particular embodiments, a client device 220 is an embedded computer and may have flash memory (for example, a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

In particular embodiments, a client device 220 may connect to a Bluetooth device 260. While only one Bluetooth device 260 is shown, the present invention contemplates client device 220 connecting to any number of Bluetooth devices 260. Further, the present invention contemplates any number of client devices 220 connecting to one or more Bluetooth devices 260 such that multiple client devices 220 may be connected to one or more unique Bluetooth devices 260. In particular embodiments, any number of client devices 220 may be connected to the same Bluetooth device(s) 260, different Bluetooth device(s) 260, or any combination thereof A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (for example, VMware® Virtual Machine), a desktop session (for example, Microsoft Terminal Server), a published application (for example, Microsoft Terminal Server), or any suitable information handling system 120. As an example, a private (for example, corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

It may be desirable, in the case of a private (for example, corporate) network including multiple sites or subnets to deploy software (including, for example, all or part of one or more operating systems, applications, add-ons, or data) to one or more client devices 220 across one or more sites or subnets. The client devices 220 may, for example, be located remotely from one or more servers 240 (including, for example, device managers or resource repositories).

In particular embodiments, one or more servers 240 of a network 210 may include a virtual Bluetooth device 280. While the virtual Bluetooth device 280 is not locally or physically connected to the server 240, the virtual Bluetooth device 280 appears to the server 240 as if it is locally connected to the server 240. Thus, Bluetooth device 260 appears to the server 240 as a virtual Bluetooth device 280. While only one virtual Bluetooth device 280 is shown, the present invention contemplates server 240 virtualizing and accessing any number of virtual Bluetooth devices 280 corresponding to any one or more Bluetooth devices 260 connected to any one or more client devices 220. Further, the present invention contemplates any number of servers 240 accessing one or more virtual Bluetooth devices 280 such that multiple servers 240 may access one or more virtual Bluetooth devices 280. In particular embodiments, any number of servers 240 may access virtual Bluetooth device(s) 280, different virtual Bluetooth device(s) 280, or any combination thereof.

As used herein, a "local" device of information handling system 120, or a device "locally" connected to information handling system 120, may be a device directly connected to the system using one or more wires or connectors (for example, physically connected to the system), or a device directly connected to the system using a wireless link (for example, Bluetooth). For example, Bluetooth device 260 is a local device connected using a wireless link to client device 220. Furthermore, in one aspect of the disclosure, a local device of an information handling system 120 or a device locally connected to information handling system 120 may include a device within the information handling system 120 (for example, an internal device (not shown) of client device 220).

A "remote" device, or a device "remote" to information handling system 120, may be a device that is not directly connected to information handling system 120. For example, server 240 is remote to both client device 220 and Bluetooth device 260 because server 240 is not directly connected to client device 220 or Bluetooth device 260 but connected indirectly through network 210, which can include, for example, another server 240, or the Internet.

In particular embodiments, client device 220 (for example, a thin client, a slim client, or a lean client) or one or more software components associated with client device 220 may depend on server 240 to fulfill its computational roles. As an example of a Virtual Desktop Infrastructure (VDI) and not by way of limitation, client device 220 may provide one or more terminal services to one or more users of client device 220. As such, the users of client device 220 may login to the same server 240 and perform tasks on the same server 240 substantially at the same time. In the VDI, one or more I/O devices 260 may be connected to client device 220. In particular embodiments, in order for the I/O devices to work seamlessly, communications associated with the I/O devices may be redirected to a Virtual Desktop (VD) operating system (OS) or a Virtual Machine (VM) OS (for example, WINDOWS SERVER 2003) of the VDI.

Figure 3:
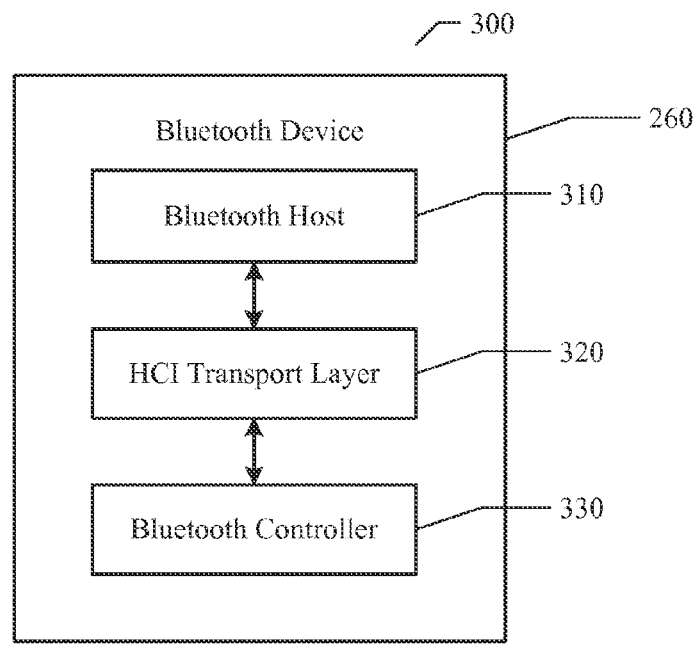
FIG. 3 is a conceptual block diagram of selected elements of a Bluetooth device.

FIG. 3 is a conceptual block diagram 300 of selected elements of a Bluetooth device 260. Bluetooth device 260 may include a Bluetooth host 310, a host controller interface (HCI) transport layer 320, and a Bluetooth controller 330. Bluetooth host 310 includes various components known to one of ordinary skill in the art for implementation of Bluetooth protocols including a Bluetooth stack and application program interfaces (APIs) and profiles. The Bluetooth host 310 is part of the application layer. The HCI transport layer delivers data between the Bluetooth host 310 and the Bluetooth controller 330. The Bluetooth controller 330 is the Bluetooth hardware that implements the lowest level of the Bluetooth architecture. For example, the Bluetooth controller 330 implements low-level communication functionalities of the Bluetooth device 260.

Figure 4:
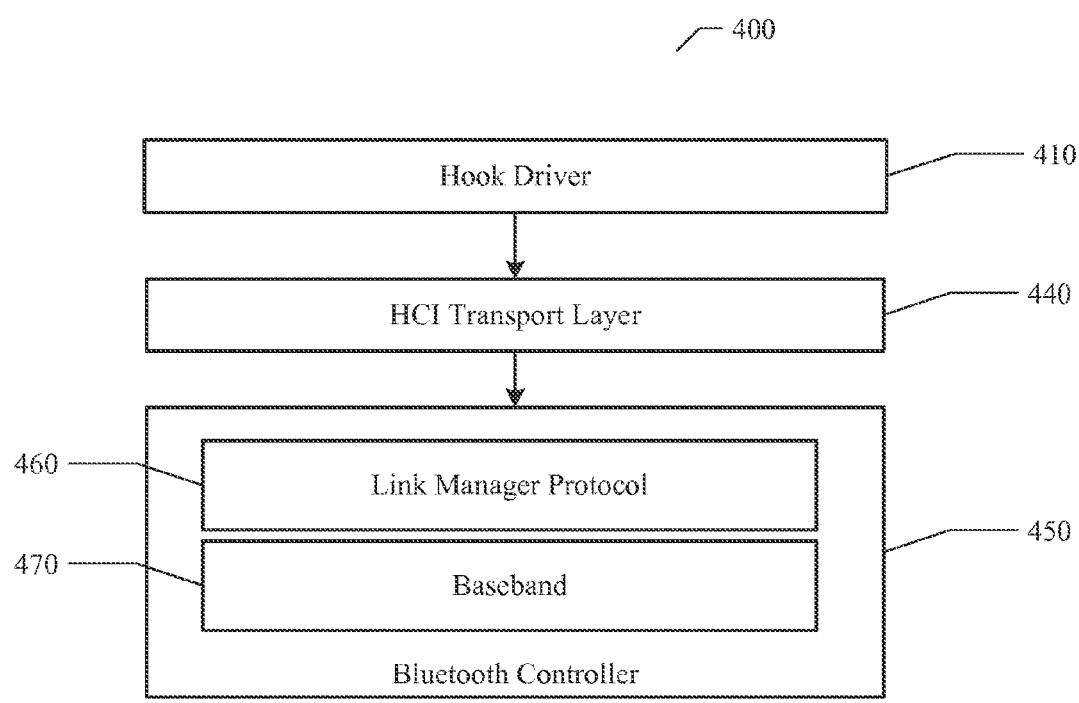
FIG. 4 is a conceptual block diagram of selected elements for one embodiment of the present invention.

FIG. 4 is a conceptual block diagram 400 of selected elements for an embodiment of the present invention. Shown generally at 400 is a configuration for a client side connecting to a Bluetooth Device. In a particular embodiment, hook driver 410 is a driver that is hooked on to a standard Bluetooth driver stack and hijacks the I/O request packets (IRP) handler. Hook driver 410 controls the driver loading capabilities for Bluetooth device 260. The hook driver 410 sits on top of the HCI transport layer 440. HCI transport layer 440 is the abstract layer within the hook driver 410 and Bluetooth controller 450. The Bluetooth controller 450 transports the data from the Bluetooth controller 450 to the HCI transport layer 420. For example, the Bluetooth controller 450 transmits data from the Bluetooth controller 450 through the HCI transport layer 440 and then on to the hook driver 410. The link manager protocol 460 controls and negotiates the connection between two Bluetooth devices 260. The baseband 470 implements the medium access and physical layer procedures between any number of Bluetooth devices 260.

Hook driver 410 will take care of loading of the Bluetooth device on the client device. The moment the user plugs in the device or connects the device at client side, the hook driver will get information about the Bluetooth device. The hook driver will not allow Bluetooth stack to load in the client site. The hook driver 410 will communicate to the server with all the information of the Bluetooth device so that the server will load the Bluetooth stack at the server side.

Figure 5:
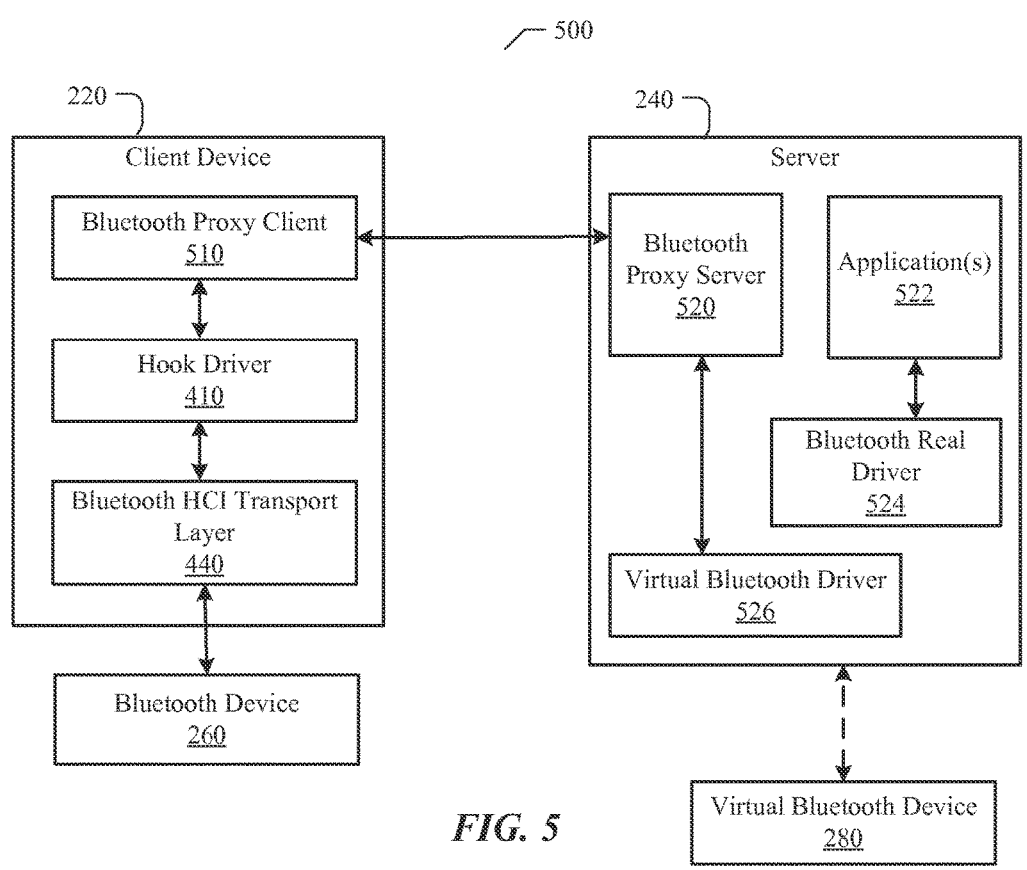
FIG. 5 is a conceptual block diagram of selected elements for redirection of Bluetooth devices.

FIG. 5 is a conceptual block diagram 500 of selected elements for redirection of a Bluetooth device 260. In a particular embodiment, client device 220 may include a Bluetooth proxy client 510, hook driver 410, and Bluetooth HCI transport layer 440. Client device 220 may couple to Bluetooth device 260. While only one Bluetooth device 260 is shown, the present invention contemplates that client device 220 may be coupled to one or more Bluetooth devices 260. The Bluetooth proxy client 510 is a service running on the client device 220. When a user couples or connects a Bluetooth device 260 to the client device 220, the Bluetooth stack will try to form the lowest part of the Bluetooth stack and continue to build the Bluetooth stack to the highest part. In a particular embodiment, the Bluetooth controller 450 is formed and then HCI transport layer 440 and so on. Once the HCI transport layer 440 is constructed, the hook driver 410 will stop the forming of the Bluetooth stack at the client device 220. Thus, the Bluetooth stack will not be formed but rather the creation of the Bluetooth stack will be transferred to the server 240 according to aspects of the present invention. After information related to the Bluetooth device 260 is transmitted to the Bluetooth proxy client 510, the Bluetooth proxy client 510 passes the information to the Bluetooth proxy server 520. The Bluetooth proxy client 510 works in conjunction with the hook driver 410 to control the driver loading capabilities of the standard Plug-and-Play (PNP) manager. The Bluetooth proxy client 510 is also responsible for creating data channels with peer component Bluetooth proxy server 520 and exchange of Bluetooth request block between the hook driver 410 and the virtual Bluetooth driver 526.

In a particular embodiment, server 240 may include Bluetooth proxy server 520, one or more applications 522, Bluetooth real driver 546, and virtual Bluetooth driver 526. Bluetooth proxy server 520 receives information related to the Bluetooth device 260 coupled to the client device 220 from the Bluetooth proxy client 510. The Bluetooth proxy server 520 is a system service running on the server 240. The Bluetooth server proxy 520 establishes a virtual channel and socket connections with Bluetooth client proxy 510 on the client device 220. The Bluetooth proxy server 520 also facilitates and participates in exchanging data between the hook driver 410 and the virtual Bluetooth driver 526. Bluetooth proxy server 520 will relay to virtual Bluetooth driver 526 that a Bluetooth device 260 has been coupled to the client device 220 and will instruct the virtual Bluetooth driver 526 to load the necessary drivers to support Bluetooth device 260 so as to virtualize the Bluetooth device 260 as virtual Bluetooth device 280. Virtual Bluetooth driver 526, once it receives the Bluetooth device information from the Bluetooth proxy server 520, will load the Bluetooth real driver 524 based, at least in part, on the received Bluetooth device information. Bluetooth real driver 524 loaded in the server will load the Bluetooth stack on the server side on top of the Bluetooth real driver 524. In this way the virtual Bluetooth device 280 is now accessible by users of client device 220 and applications 522. The virtual Bluetooth driver 526 assists in emulating Bluetooth devices 260 on the virtual (server 240) side.

Figure 6:
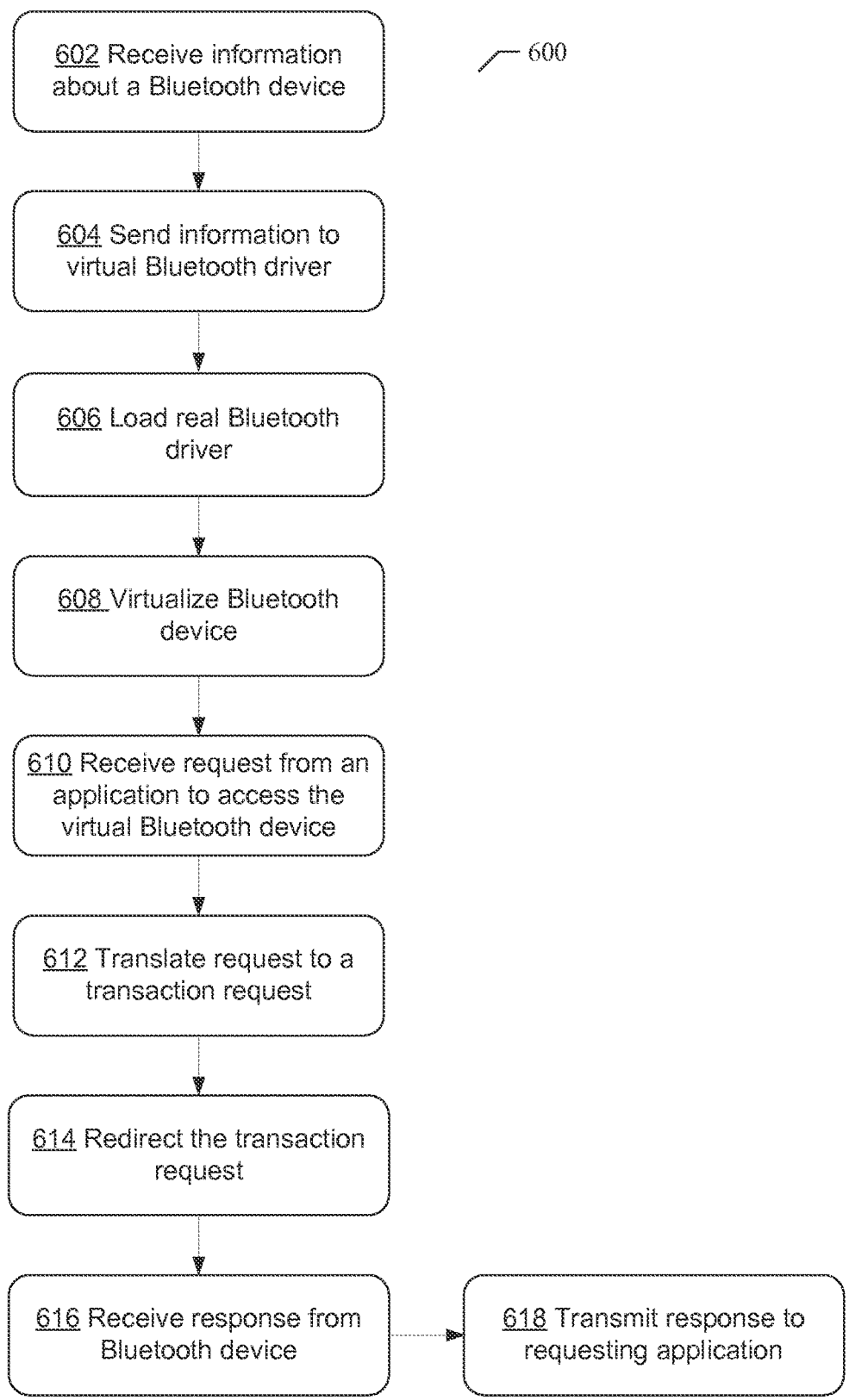
FIG. 6 is a flowchart illustrating an exemplary method for redirection of Bluetooth devices.

FIG. 6 is a flowchart illustrating an exemplary method for redirection of Bluetooth devices at 600. At step 602 in FIG. 6, the Bluetooth proxy server 520 receives information related to the Bluetooth device 260 coupled to the client device 220 from the Bluetooth proxy client 510. At step 604, the information received by the Bluetooth proxy server 520 is sent to the virtual Bluetooth driver 526. Once the virtual Bluetooth driver 526 receives the information about the Bluetooth device 260, at step 606 the virtual Bluetooth driver 526 loads the real Bluetooth driver 524 on the sever 240. In one embodiment the Bluetooth stack is loaded on top of the real Bluetooth driver 524 by the real Bluetooth driver 524. Once the real Bluetooth driver 524 and Bluetooth stack are loaded, at step 608 the virtual Bluetooth device 280 is available (or virtualized) for accessing by a user of client device 220 or applications 522.

Any number of Bluetooth real drivers 524 may be loaded so as to make accessible any number of Bluetooth devices 260 coupled to any number of client devices 220. Also, one or more applications 522 may request and receive requests from any one or more of Bluetooth devices 260.

At step 610, a request is received from an application attempting to access or utilize the virtual Bluetooth device 280. The received requests are translated at step 612 to a transaction request. At step 614, the transaction request is redirected by the virtual Bluetooth driver 526 to the Bluetooth device 260 at the client device 220. At step 616, one or more responses are received from the Bluetooth device 260 by the virtual Bluetooth driver 526. At step 618, the virtual Bluetooth driver 526 transmits the one or more responses to the requesting application 522.

Figure 7:
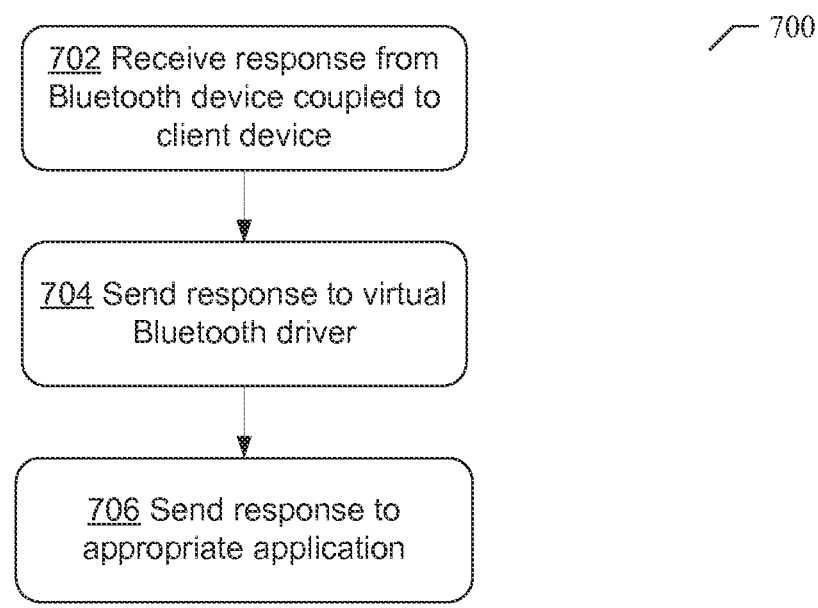
FIG. 7 is a flowchart illustrating an exemplary method for redirection of Bluetooth devices.

FIG. 7 is a flowchart illustrating an exemplary method for redirection of Bluetooth devices at 700. At step 702 in FIG. 7, in one embodiment a Bluetooth device 260 has already been virtualized at the server 240 whereupon a response is received at the server 240 from the Bluetooth device 260. In one embodiment, a response may be a response to a previous request by a user of client device 220 or an application 522 as illustrated in FIG. 6. A response may also be Bluetooth device 260 sending a request to a user of client device 220 or an application 522. A response may also be data provided by the Bluetooth device 260 to server 240 or any other response known to one of ordinary skill in the art. The Bluetooth device 260 transmits the response, as discussed with respect to FIG. 5 and FIG. 6, to the Bluetooth proxy client 510 which transmits the response to the Bluetooth proxy server 520 at the server 240. The response at step 704 is transmitted from the Bluetooth proxy client 510 to the virtual Bluetooth driver 526. At step 706, the virtual Bluetooth driver 526 transmits the response to the appropriate application 522.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled or communicatively coupled.

Terms such as top, bottom, upward, downward and the like, if used in this disclosure, should be understood as referring to an arbitrary frame of orientation. For example, a top according to one orientation may be a bottom or a side in another orientation. Also, a top may be a portion of top layers, if there are multiple layers.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules. For example, a local link creation module and a local link deletion module may be combined into one module.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A method comprising:
   receiving at a Bluetooth proxy server of a server first information about a first Bluetooth device coupled to a first client from a Bluetooth proxy client of the first client, wherein the Bluetooth proxy client is a service running on the first client, and wherein the Bluetooth proxy server is a system service running on the server;
   establishing, by the Bluetooth proxy server, a virtual channel and a socket connection with the Bluetooth proxy client;
   transmitting the first information to a first virtual Bluetooth driver of the server;
   loading, by the first virtual Bluetooth driver, a first real Bluetooth driver based, at least in part, on the first information;
   making accessible a first virtual Bluetooth device;
   receiving a first request from at least one of one or more applications to access the first virtual Bluetooth device;
   translating the first request to a first transaction request; and
   redirecting the first transaction request to the first Bluetooth device.

2. The method of claim 1, further comprising:
   receiving a first response associated with the first transaction request from the first Bluetooth device; and
   transmitting the first response to the first application.

3. The method of claim 1, further comprising:
   loading by the first virtual Bluetooth driver a first Bluetooth stack to make the first virtual Bluetooth device accessible by the at least one of one or more applications.

4. The method of claim 1, further comprising:
   receiving at the server second information about a second Bluetooth device coupled to a second client;
   transmitting the second information to the first virtual Bluetooth driver;
   loading, by the first virtual Bluetooth driver, a second real Bluetooth driver based, at least in part, on the second information;
   making accessible a second virtual Bluetooth device;

receiving a second request from at least one of one or more applications to access the second virtual Bluetooth device;
translating the second request to a second transaction request; and
redirecting the second transaction request to the second Bluetooth device.

5. The method of claim 1, further comprising:
receiving a second response associated with the second transaction request from the second Bluetooth device; and
transmitting the second response to the second application.

6. The method of claim 1, further comprising:
wherein the second virtual Bluetooth driver loads a second Bluetooth stack to make the second virtual Bluetooth device accessible by the at least one of one or more applications.

7. One or more computer-readable non-transitory storage media embodying software that is operable when executed to:
receive at a Bluetooth proxy server of a server first information about a first Bluetooth device coupled to a first client from a Bluetooth proxy client of the first client, wherein the Bluetooth proxy client is a service running on the first client, and wherein the Bluetooth proxy server is a system service running on the server;
establishing, by the Bluetooth proxy server, a virtual channel and a socket connection with the Bluetooth proxy client;
transmit the first information to a first virtual Bluetooth driver of the server;
load, by the first virtual Bluetooth driver, a first real Bluetooth driver based, at least in part, on the first information;
make accessible a first virtual Bluetooth device;
receive a first request from at least one of one or more applications to access the first virtual Bluetooth device;
translate the first request to a first transaction request; and
redirect the first transaction request to the first Bluetooth device.

8. The media of claim 7, wherein the software when executed is further operable to:
receive a first response associated with the first transaction request from the first Bluetooth device; and
transmit the first response to the first application.

9. The media of claim 7, wherein the software when executed is further operable to:
load, by the first virtual Bluetooth driver, a first Bluetooth stack to make the first virtual Bluetooth device accessible by the at least one of one or more applications.

10. The media of claim 7, wherein the software when executed is further operable to:
receive at the server second information about a second Bluetooth device coupled to a second client;
transmit the second information to the first virtual Bluetooth driver;
load, by the first virtual Bluetooth driver, a second real Bluetooth driver based, at least in part, on the second information;
make accessible a second virtual Bluetooth device;

receive a second request from at least one of one or more applications to access the second virtual Bluetooth device;
translate the second request to a second transaction request; and
redirect the second transaction request to the second Bluetooth device.

11. A system comprising:
one or more processors; and
a memory coupled to the processors comprising instructions executable by the processors, the processors being operable when executing the instructions to:
receive at a Bluetooth proxy server of a server first information about a first Bluetooth device coupled to a first client from a Bluetooth proxy client of the first client, wherein the Bluetooth proxy client is a service running on the first client, and wherein the Bluetooth proxy server is a system service running on the server;
establishing, by the Bluetooth proxy server, a virtual channel and a socket connection with the Bluetooth proxy client
transmit the first information to a first virtual Bluetooth driver of the server;
load, by the first virtual Bluetooth driver, a first real Bluetooth driver based, at least in part, on the first information;
make accessible a first virtual Bluetooth device;
receive a first request from at least one of one or more applications to access the first virtual Bluetooth device;
translate the first request to a first transaction request; and
redirect the first transaction request to the first Bluetooth device.

12. The system of claim 11, wherein the processors are further operable when executing instructions to:
receive a first response associated with the first transaction request from the first Bluetooth device; and
transmit the first response to the first application.

13. The system of claim 11, wherein the processor are further operable when executing instructions to:
load by the first virtual Bluetooth driver a first Bluetooth stack to make the first virtual Bluetooth device accessible by the at least one of one or more applications.

14. The system of claim 11, wherein the processors are further operable when executing instructions to:
receive at the server second information about a second Bluetooth device coupled to a second client;
transmit the second information to the first virtual Bluetooth driver;
load, by the first virtual Bluetooth driver, a second real Bluetooth driver based, at least in part, on the second information;
make accessible a second virtual Bluetooth device;
receive a second request from at least one of one or more applications to access the second virtual Bluetooth device;
translate the second request to a second transaction request; and
redirect the second transaction request to the second Bluetooth device.

* * * * *